United States Patent
Tesch et al.

(10) Patent No.: US 7,080,316 B2
(45) Date of Patent: Jul. 18, 2006

(54) METHOD FOR DETERMINING RUBIES

(75) Inventors: Falko Tesch, Hamburg (DE); Lutz Hoeger, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 730 days.

(21) Appl. No.: 10/054,545

(22) Filed: Jan. 18, 2002

(65) Prior Publication Data

US 2002/0116414 A1 Aug. 22, 2002

(30) Foreign Application Priority Data

Jan. 22, 2001 (EP) .................................. 01101380

(51) Int. Cl.
*G06F 17/21* (2006.01)
*G06F 17/24* (2006.01)
*G06F 17/28* (2006.01)

(52) U.S. Cl. ...................... 715/512; 715/509; 715/510; 715/536; 704/5; 704/10

(58) Field of Classification Search ................ 715/500, 715/512, 509, 510, 520, 536; 704/5, 10
See application file for complete search history.

(56) References Cited

U.S. PATENT DOCUMENTS 5,576,955 A * 11/1996 Newbold et al. ........... 715/533
5,594,642 A * 1/1997 Collins et al. .............. 715/535
5,604,897 A * 2/1997 Travis ........................ 715/533
6,092,068 A * 7/2000 Dinkelacker ................ 707/100
6,424,982 B1 * 7/2002 Vogel .......................... 715/531
6,567,830 B1 * 5/2003 Madduri ..................... 715/512
6,782,510 B1 * 8/2004 Gross et al. ................. 715/533

OTHER PUBLICATIONS

Sawicki, M. et al., Ruby Annotation, W3C Working Draft, Dec. 17, 1999, Retrieved from the internet:<URL: http://www.w3.org/TR/1999/WD-ruby-19991217.
How to put Hurigana (Rubi), 2000, retrieved from the internet on Jul. 5, 2002:<URL:http//www.research-j.org/e-japanese/english/japanese-computing/how-to-rubi.html>.

* cited by examiner

*Primary Examiner*—Stephen Hong
*Assistant Examiner*—Joshua D. Campbell
(74) *Attorney, Agent, or Firm*—Gunnison, McKay & Hodgson, L.L.P.; Serge J. Hodgson

(57) ABSTRACT

A user selects base text from a working document for which ruby text is desired. The base text is displayed in a ruby handling window. Despite the ruby handling window being open, the user can change focus to the working document, perform normal operations in the working document, such as text editing or may even change the selection of the base text. Such an amendment of the selected base text is then directly updated in the ruby handling window based on the newly selected base text.

22 Claims, 11 Drawing Sheets

METHOD FOR DETERMINING RUBIES

BACKGROUND OF THE INVENTION

1. Field of the Invention

The present invention relates to a method for determining rubies. More particularly, the present invention relates to a ruby handling functionality for determining, entering and editing ruby text.

2. Description of the Related Art

"Ruby text" is the commonly used name for a run of text that appears in the immediate vicinity of another run of text, referred to as the "base text". Ruby text serves as a pronunciation guide or a short annotation associated with the base text. Ruby text is used frequently in Japan in most kinds of publications, such as books and magazines, and also in China and Korea.

A ruby handling functionality is needed for computer programs which deal with Chinese, Japanese or Korean characters. For example, contrary to Western or Roman characters, Chinese characters often represent a word by a single character. Such Chinese characters (or Kanji) may be difficult to read because there are so many of them and one may not expect everybody to know all of them. Consequently, there is a need for expressing the way of reading a Chinese character by its phonetic transcription to enable people who do not recognize the character to nevertheless read it.

FIG. 1 gives an example of a simple Japanese sentence in which Chinese characters 100 are superposed by their phonetic transcriptions. Those phonetic transcriptions are written using relatively simple characters 102, which only represent the phonetic content of Chinese characters 100 rather than the semantic meaning. Characters 102, which are used for the phonetic transcription, are called "rubies" or "ruby text", or in Japanese they are called "furigana" or "furigana transcription".

In the example of FIG. 1, the sentence would read in Roman characters 104 "kore wa nihongo no rei", which means "this is an example in Japanese". Above the nouns "nihongo" and "rei" are their corresponding "rubies" in furigana, sometimes called furigana transcription. Even people who do not recognize the Chinese characters 100, sometimes called base text, therefore can read the sentence because they can be assumed to recognize the relatively simple furigana transcription 102 displayed above them. The transcription in Roman characters 104 shown in the bottom line of FIG. 1 is shown here for illustrative purposes only and typically is not displayed.

The easy reading of ruby text is possible because for the ruby text only a limited set of relatively simple characters (about several dozens) are used while there exist thousands of very complicated Chinese characters (kanjis) which cannot be assumed to be known by everybody.

Additional information about rubies can be found in "Ruby Annotation", W3C working draft, 17 Dec. 1999 Sawicki et al., available at http://www.w3-org/TR/1999,/ WD-ruby-19991217, which is herein incorporated by reference its entirety, and which contains a draft specification of markup for ruby and which also discusses some basics about ruby.

FIG. 2 illustrates an example of a ruby handling window 200 in accordance with the prior art. At first, a user selects a base text for which the user desires to generate ruby text, which then should be displayed superposed to (or above) the base text. In the example of FIG. 2, it is assumed that the base text for which a ruby generation should be performed is the same as base text 100 in FIG. 1.

After having selected this text as the base text from a document, a user may then start the ruby functionality and subsequently ruby handling window 200 as shown in FIG. 2 pops up. In ruby handling window 200, one can see a table 210, which contains two columns C1 and C2, base text column C1 for the selected base text and ruby text column C2 for the corresponding ruby text.

In a conventional ruby handling functionality there is provided an automatic ruby determination function for detecting individual words in the base text and for identifying corresponding ruby text. Each individual word, which is recognized as having corresponding ruby text, is displayed in a different row R1–R4 in table 210.

In table 210 one can see that the nouns "nihongo" and "rei" have been recognized by the automatic ruby determination function, and consequently each of those nouns is displayed in a different row of table 210, the noun "nihongo" in the second row R2 and the noun "rei" in the fourth row R4, both of base text column C1.

The characters, which are displayed in the first and the third rows R1 and R3 of base text column C1, do not have corresponding ruby text, therefore the corresponding ruby text cells are left empty. In a preview window 220, the user is provided with a display, sometimes called preview, of base text 100 together with the corresponding ruby text 102. If the user does not agree with the proposed ruby text 102, the user can edit the ruby text in ruby text column C2 of table 210 and consequently the preview in preview window 220 also changes.

If the display in preview window 220 is found to be correct by the user, the user may press the ok button 230. Subsequently, in the text document from which the base text has been selected, there is displayed the base text together with its corresponding ruby text as it had been shown in the preview window 220. Although satisfactory for certain applications, the ruby handling functionality described above is relatively inflexible.

SUMMARY OF THE INVENTION

In accordance with one embodiment of the invention, a ruby handling functionality is a method for determining, entering, and editing ruby text. The ruby handling functionality according to one specific embodiment of the invention is so-called mode-less ruby handling functionality. Thus, a ruby handling window, while being displayed, does not prevent the user from working on a text document window from which a base text has been selected. Both windows may be displayed simultaneously on a display and a user may just change focus between the windows as in the conventional windows technology and may work in any of both of the windows which is in the focus.

Thus, a user can change the focus from the ruby handling window to the text document window and can amend the selected base text.

Thus, due to the ruby handling functionality being modeless, a user can in a very flexible manner select base text for which ruby text is desired. The selected base text can then easily be altered due to the mode-less design of the ruby handling window. Despite the ruby handling window being open, a user can still change focus to text document window, perform normal operations in the working document in the text document window, such as text editing or may even change the selection of the base text. Such an amendment of the selected base text is then directly updated in the ruby handling window based on the newly selected base text.

In accordance with one embodiment of the invention, a method includes selecting a first base text from a working document. The first base text is displayed in a first base text cell. The first base text is altered to a second base text and the second base text is displayed in the first base text cell. A first ruby text is entered into a first ruby text cell corresponding to the first base text cell.

In accordance with another embodiment of the invention, a method includes selecting a first base text from a working document and displaying the first base text in a first base text cell. A second base text is selected from the working document and displaying in a second base text cell. A first ruby text is entered into a first ruby text cell corresponding to the first base text cell and a second ruby text is entered into a second ruby text cell corresponding to the second base text cell.

In accordance with another embodiment of the invention, a method includes searching a working document for all occurrences of a base text and displaying all of the occurrences of the base text in base text cells. A ruby text is entered into a first ruby text cell. The ruby text in the first ruby text cell is pasted into ruby text cells corresponding with the base text cells.

In accordance with yet another embodiment of the invention, a method includes selecting a base text from a working document and determining that an automatic recognition function is active. The base text is parsed to detect individual words. Ruby text corresponding to the individual words is identified and displayed together with the individual words.

In accordance with another embodiment of the invention, a computer program product has stored thereon a module for a ruby handling functionality, wherein execution of said module generates a method comprising:
  selecting a first base text from a working document;
  displaying said first base text in a first base text cell;
  altering said first base text to a second base text;
  displaying said second base text in said first base text cell; and
  entering a first ruby text into a first ruby text cell.

In accordance with another embodiment of the invention, a computer system comprises:
  a memory having stored therein a module for a ruby handling functionality; and
  a processor coupled to said memory, wherein execution of said module by said processor generates a method comprising:
  selecting a first base text from a working document;
  displaying said first base text in a first base text cell;
  altering said first base text to a second base text;
  displaying said second base text in said first base text cell; and
  entering a first ruby text into a first ruby text cell.

BRIEF DESCRIPTION OF THE DRAWING

FIG. 3 illustrates a ruby handling window according to an embodiment of the invention with automatic ruby determination function being on.

In the figures and the following detailed description, features with the same reference numeral are the same or equivalent features.

DETAILED DESCRIPTION

Figure 1:
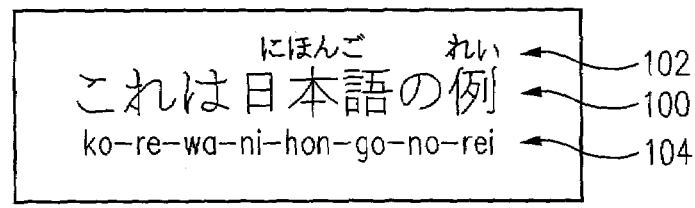
FIG. 1 shows an example of a Japanese base text together with corresponding ruby text.
Figure 2:
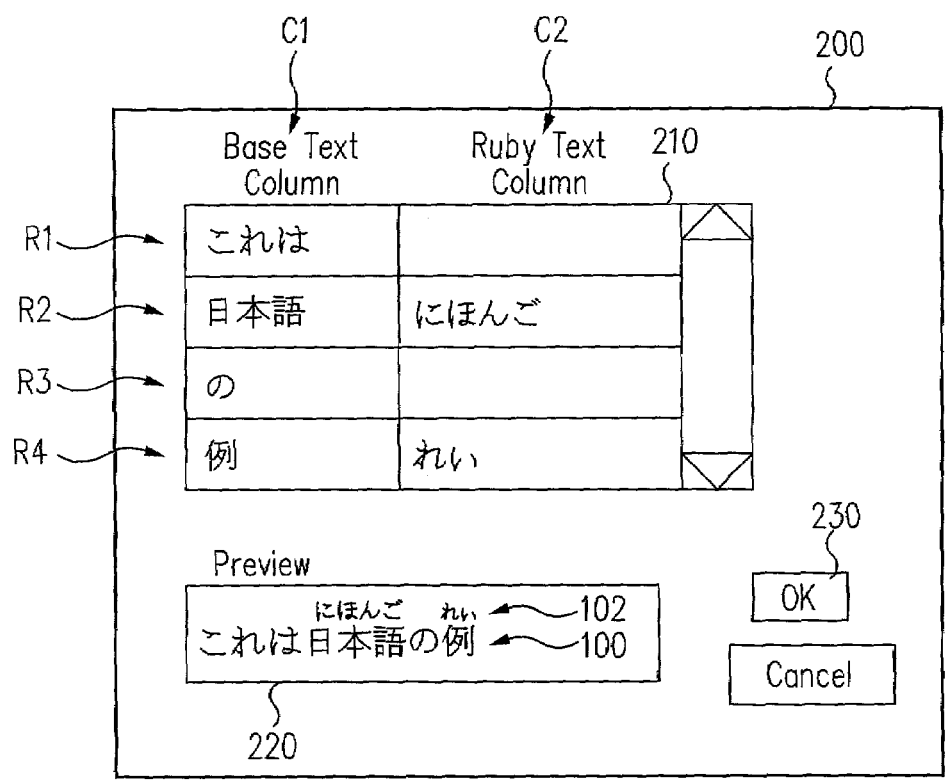
FIG. 2 illustrates an example of a conventional ruby handling window.

In accordance with one embodiment of the invention, a ruby handling functionality is a method for determining, entering, and editing ruby text. The ruby handling functionality according to one specific embodiment of the invention is so-called mode-less ruby handling functionality. For example, a ruby handling window 300 shown in FIG. 4, while being displayed, does not prevent the user from working on a text document window 450 from which a base text 460 has been selected. Both windows 450 and 300 may be displayed simultaneously on a display 400 and a user may just change focus between windows 450 and 300 as in the conventional windows technology and may work in any of both windows 450 and 300, which is in the focus.

Thus, a user can change the focus from ruby handling window 300 to text document window 450 and can amend the selected base text 460.

Thus, due to the ruby handling functionality being modeless, a user can in a very flexible manner select base text for which ruby text is desired. The selected base text can then easily be altered due to the mode-less design of the ruby handling window 300. Despite the ruby handling window 300 being open, a user can still change focus to text document window 450, perform normal operations in the working document in text document window 450, such as text editing or may even change the selection of the base text. Such an amendment of the selected base text is then directly updated in ruby handling window 300 based on the newly selected base text.

Figure 3:
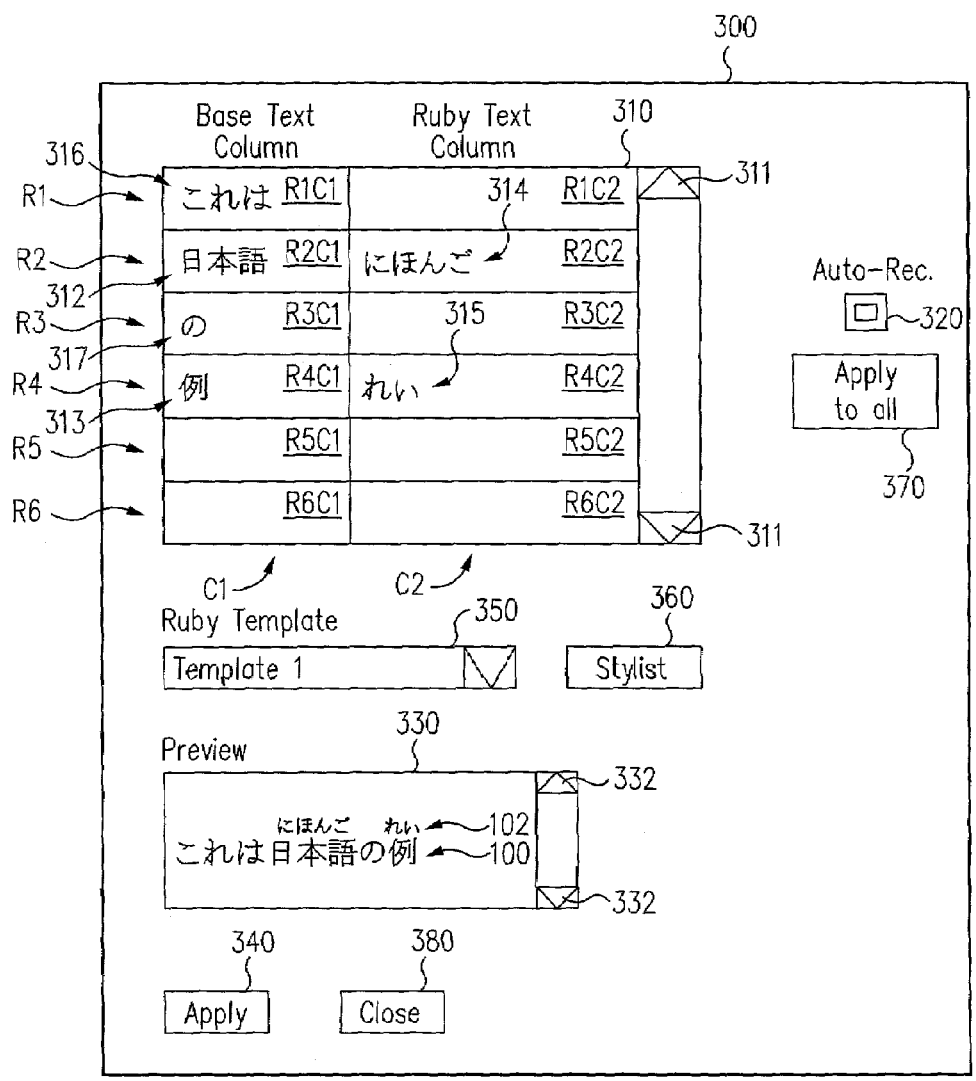

More particularly, FIG. 3 illustrates a ruby handling window 300, sometimes called a first window or a user interface, according to an embodiment of the invention with an automatic ruby determination function being on. Ruby handling window 300 includes a table 310, an automatic recognition toggle 320, a preview window 330, an apply button 340, a pull-down ruby template menu 350, a stylist-option button 360, an apply to all button 370, and a close button 380.

Table 310, sometimes called a table window, includes a plurality of cells R1C1 to RnC2 arranged in rows R1 to Rn and columns C1 and C2 of table 310. In FIG. 3, rows R1 to R6 are illustrated in table 310. However, additional rows are viewed by scrolling on arrows 311 of table 310.

At first, a user selects base text from a document for which the user desires to generate ruby text. In the embodiment of FIG. 3, the selected base text is the same as base text 100 in FIG. 1.

After having selected base text 100 from a document, the user starts the ruby handling functionality and ruby handling window 300 of FIG. 3 pops up on the user's display.

In this embodiment, automatic recognition toggle 320 has been toggled such that an automatic ruby determination function is active, sometimes called turned on. The automatic ruby determination function, sometimes called automatic recognition function, detects individual words in the base text and identifies corresponding individual ruby text. Each individual word, which is recognized as having corresponding ruby text, is displayed in a different row R1 to Rn of base text column C1. The individual ruby text corresponding to the individual word is displayed in the same row as the individual word but in ruby text column C2. The cells R1C1 to RnC1 in base text column C1 are called base text cells. Similarly, the cells R1C2 to RnC2 in ruby text column C2 are called ruby text cells.

To illustrate, the individual words 312, 313, more specifically nouns, "nihongo" and "rei", have been recognized by the automatic ruby determination function. Individual words 312, 313 are hereinafter referred to as individual words "nihongo" and "rei" for clarity of discussion. Consequently, individual words "nihongo" and "rei" are displayed in different rows R2 and R4 of base text column C1, respectively. More particularly, individual words "nihongo" and "rei" are displayed in base text cells R2C1 and R4C1, respectively.

Individual ruby texts 314, 315 corresponding to individual words "nihongo" and "rei" are displayed in the same row as the individual words but in ruby text column C2. To illustrate, individual ruby texts 314, 315 are displayed in different rows R2 and R4 of ruby text column C2, respectively. More particularly, individual ruby texts 314, 315 are displayed in ruby text cells R2C2 and R4C2, respectively.

Characters 316, 317, which are displayed in rows R1 and R3 of base text column C1, do not have any corresponding ruby text. Therefore the corresponding rows in ruby text column C2 are left empty. More particularly, characters 316, 317 are displayed in base text cells R1C1 and R3C1, respectively. The corresponding ruby text cells R1C2, R3C2, respectively, are left empty.

In preview window 330, the user is provided with a display of the base text in rows R1 to Rn of base text column C1. In this illustration, base text 100, i.e., individual words "nihongo", "rei" and characters 316, 317, is illustrated in preview window 330. The corresponding individual ruby texts 314, 315 are also illustrated in preview window 330 as ruby text 102.

If the user determines that individual ruby text 314 and/or individual ruby text 315 are incorrect or inappropriate, the user edits individual ruby text 314 and/or individual ruby text 315 in ruby text cell R2C2 and/or ruby text cell R4C2, respectively, and the preview in preview window 330 accordingly changes.

If the user is satisfied with the preview in preview window 330, the user activates, e.g., pushes, apply button 340 to add the ruby text above the base text in the text document.

Figure 4:
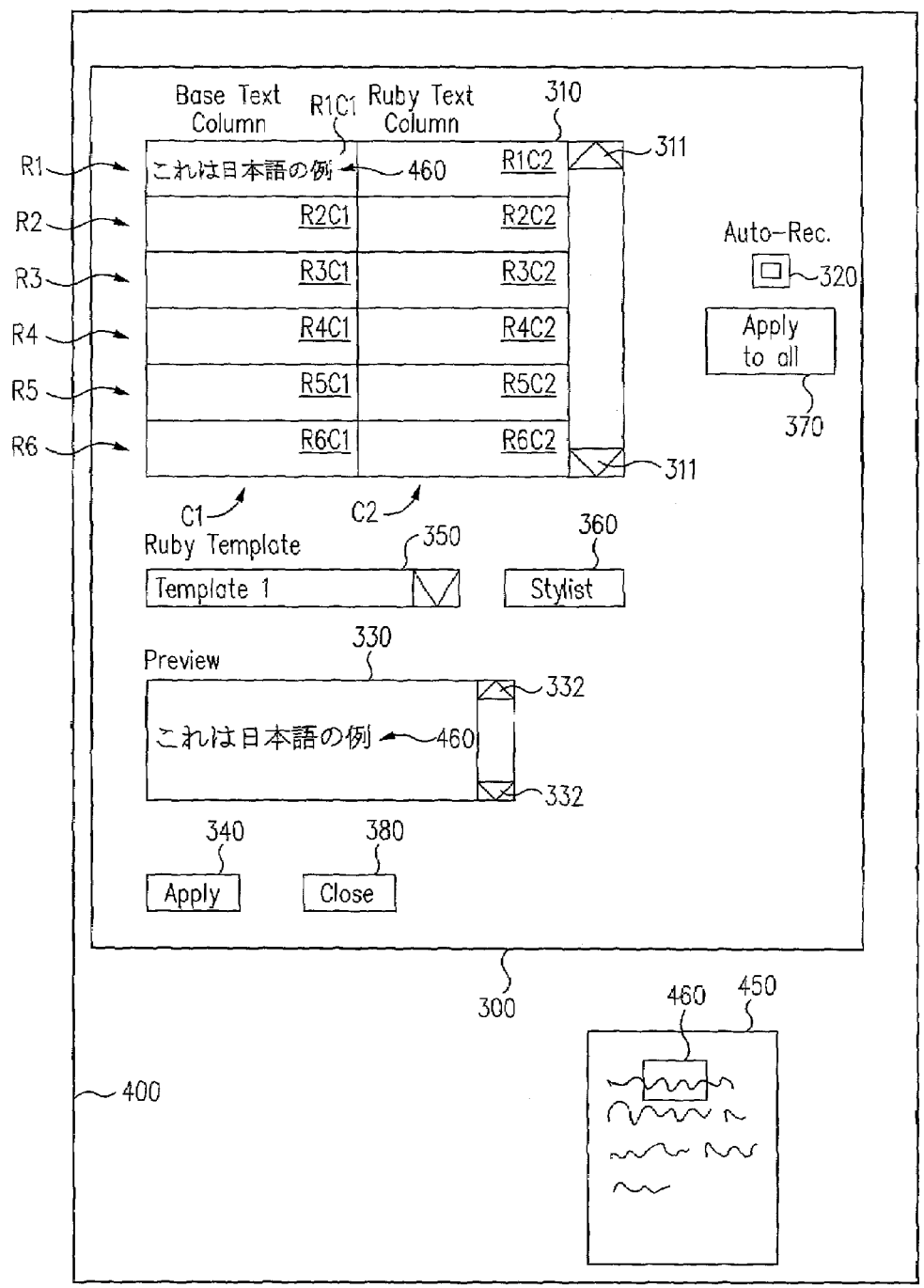
FIG. 4 illustrates a display including a ruby handling window according to an embodiment of the invention with the automatic ruby determination function being off.

FIG. 4 illustrates a display 400 including a ruby handling window 300 according to an embodiment of the invention with the automatic ruby determination function being off.

Display 400 includes a text document window 450, sometimes called a second window, having base text 460 selected.

Turning now to FIG. 4, there is shown the status of ruby handling window 300 of FIG. 3 after automatic recognition toggle 320 has been toggled, e.g., pushed, to deactivate the automatic ruby determination function. More particularly, automatic recognition toggle 320 has been toggled to turn off the automatic ruby determination function.

Since the automatic ruby determination function is turned off, rather than automatically searching for the ruby text corresponding to the individual words in the base text as discussed above in reference to FIG. 3, no automatic ruby determination (and search) is performed. Rather base text 460, sometimes called a first base text, selected from text document window 450 is displayed in the first row R1 of base text column C1 of table 310. More particularly, base text 460 is displayed in base text cell R1C1, sometimes called a first base text cell. The corresponding ruby text cell, i.e., ruby text cell R1C2, is empty since the automatic ruby determination function is off. Consequently, only base text 460 is displayed in preview window 330.

By switching the automatic ruby determination function off, the whole selected base text 460 has been moved into first row R1 of base text column C1 of table 310 and, more particularly, into the first base text cell R1C1. Base text 460 shown in table 310 corresponds to base text 460, which has been selected in text document window 450. For example, the selection of base text 460 in text document window 450 is carried out by marking base text 460 by the mouse.

In accordance with one embodiment of the invention, the ruby handling functionality is the method for determining, entering, and editing ruby text. The ruby handling functionality according to this specific embodiment of the invention is so-called mode-less ruby handling functionality. Thus, ruby handling window 300 shown in FIG. 4, while being displayed, does not prevent the user from working on text document window 450 from which base text 460 shown in the first row R1 of base text column C1 of table 310 has been selected. Both windows 450 and 300 may be displayed simultaneously on display 400, sometimes called screen, and a user may just change focus between windows 450 and 300 as in the conventional windows technology and may work in any of both windows 450 and 300 which is in the focus.

Thus, a user can change the focus from ruby handling window 300 to text document window 450 and can amend the selected base text 460. The result of such an amendment of the selected base text is exemplary shown in FIG. 5.

Figure 5:
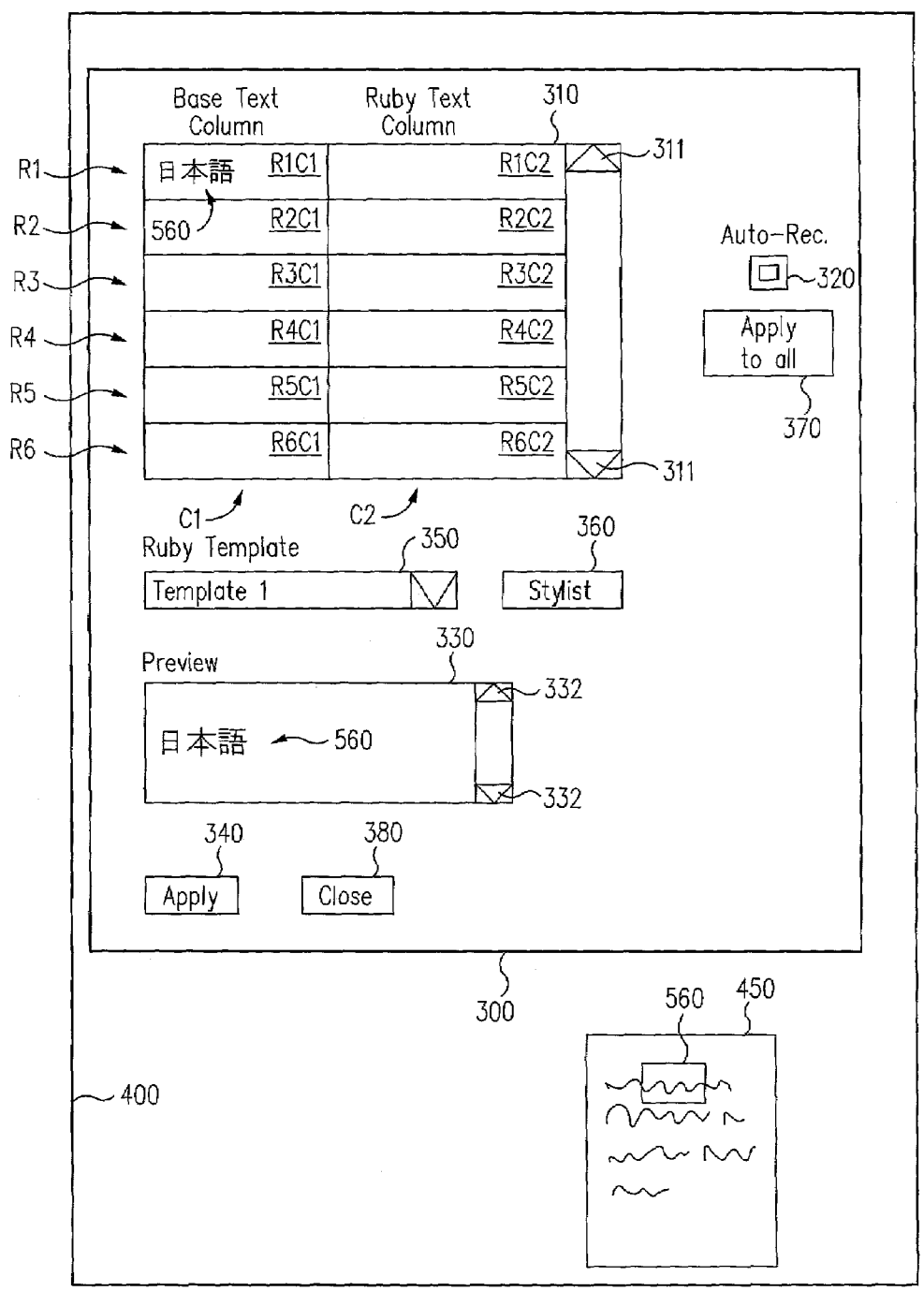
FIG. 5 illustrates the display including the ruby handling window of FIG. 4 according to an embodiment of the invention after an amendment of the selected base text.

FIG. 5 illustrates display 400 including ruby handling window 300 of FIG. 4 according to an embodiment of the invention after an amendment of the selected base text.

In FIG. 5, base text 560, sometimes called a second base text, has been selected by the user from the working document in text document window 450. Base text 560 is smaller than base text 460 of FIG. 4. More particularly, base text 560 is a portion of base text 460 of FIG. 4. Stated another way, the user has altered base text 460 to base text 560.

Consequently, in the first row R1 of base text column C1 of table 310, only a portion of base text 460 shown in table 310 of FIG. 4 is displayed, i.e., base text 560. More particularly, base text 560 is displayed in base text cell R1C1.

Thus, due to the ruby handling functionality being mode-less, a user can in a very flexible manner select base text for which ruby text is desired. The selected base text can then easily be altered due to the mode-less design of the ruby handling window 300. Despite the ruby handling window 300 being open, a user can still change focus to text document window 450, perform normal operations in the working document in text document window 450, such as text editing or may even change the selection of the base text. Such an amendment of the selected base text is then directly updated in ruby handling window 300 based on the newly selected base text.

The working document in text document window 450 is any document on which some operation is performed, such as a text document edited by a word processor, a website displayed by a browser, an image containing some text, or any other document containing some text which can be selected as base text for the ruby text generation.

After having selected the base text as shown in FIG. 5, a user may according to the user's preferences enter the corresponding ruby text into the corresponding ruby text cell R1C2 in row R1 of ruby text column C2 of table 310. If the user is satisfied with the selected base text and the ruby text which the user has inputted, the user activates apply button 340 to add the ruby text to the working document in text document window 450. Then, above base text 560 in the working document in text document window 450, the ruby text that is shown in preview window 330 is displayed.

The possibility to switch off the automatic ruby determination function together with the updating of the selected base text allows a very flexible handling of the ruby handling functionality. Rather than being dependent on the automatic ruby determination function, a user individually selects the base text, updates the selected base text, and then depending on the user's preferences, inserts and edits the corresponding ruby text.

Figure 6:
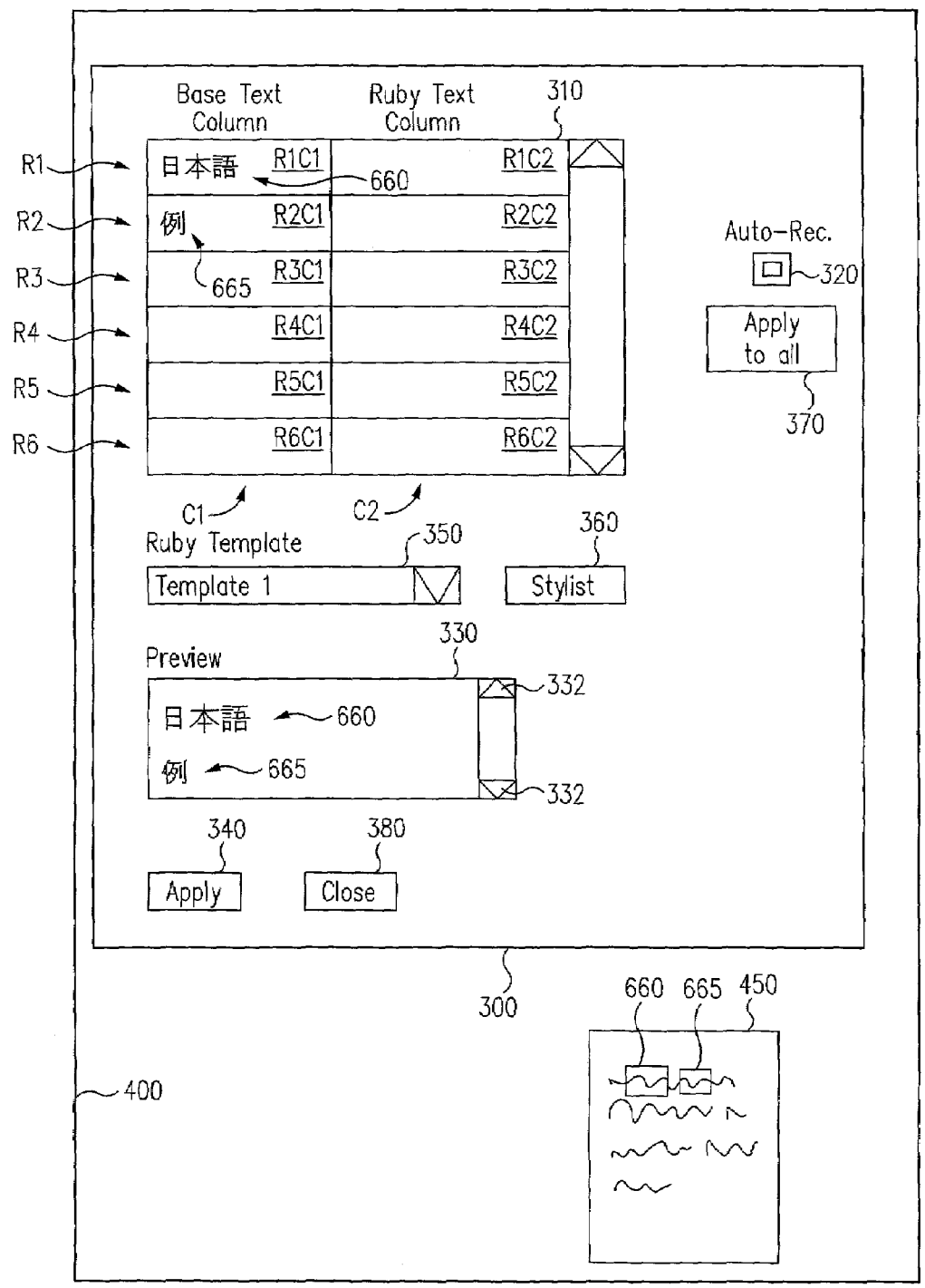
FIG. 6 illustrates the display including the ruby handling window of FIG. 5 according to an embodiment of the invention after multi-selection has been used.

FIG. 6 illustrates display 400 including ruby handling window 300 of FIG. 5 according to an embodiment of the invention after multi-selection has been used.

In accordance with this embodiment, the ruby handling functionality is used in connection with the so-called multi-selection capability. For example, the multi-selection capability is a feature which is well known and which is offered by comprehensive office application STAROFFICE that is available from Sun Microsystems, Inc. of Palo Alto, Calif. (STAROFFICE is a trademark of Sun Microsystems.) By pressing the Ctrl-key on the keyboard, a user can select multiple text portions in a text document by using the left mouse button.

In the working document in text document window 450, two base texts 660 and 665 have been selected. The first selected base text 660 is displayed as base text 660 in the first row R1 in base text column C1 in table 310, i.e., in base text cell R1C1. Similarly, the second selected base text 665 is displayed in the second row R2 of base text column C1 of table 310, i.e., in base text cell R2C1, sometimes called a second base text cell. For the base text selected, a user inserts and edits corresponding ruby text in ruby text column C2 of table 310. For example, a first ruby text is inserted and edited in ruby text cell R1C2 and a second ruby text is inserted and edited in ruby text cell R2C2, sometimes called a second ruby text cell.

By carrying out the ruby handling functionality only once, a user can nevertheless apply ruby text for arbitrarily selected base texts of the working document in text document window 450. Preview window 330 shows a preview of selected base texts 660, 665 and the corresponding ruby text. In case of FIG. 6, no ruby texts have been inputted yet, consequently no ruby texts are displayed in preview window 330. The user can scroll through preview window 330 using arrows 332 of preview window 330.

A particular feature of the multi-selection capability is the so-called "search for all" option, which is also known from the comprehensive office application STAROFFICE, for example. Using the "search" option in the task bar and selecting the option "search for all", a user can select for all occurrences of a certain word or a certain text in a text document.

Figure 7:
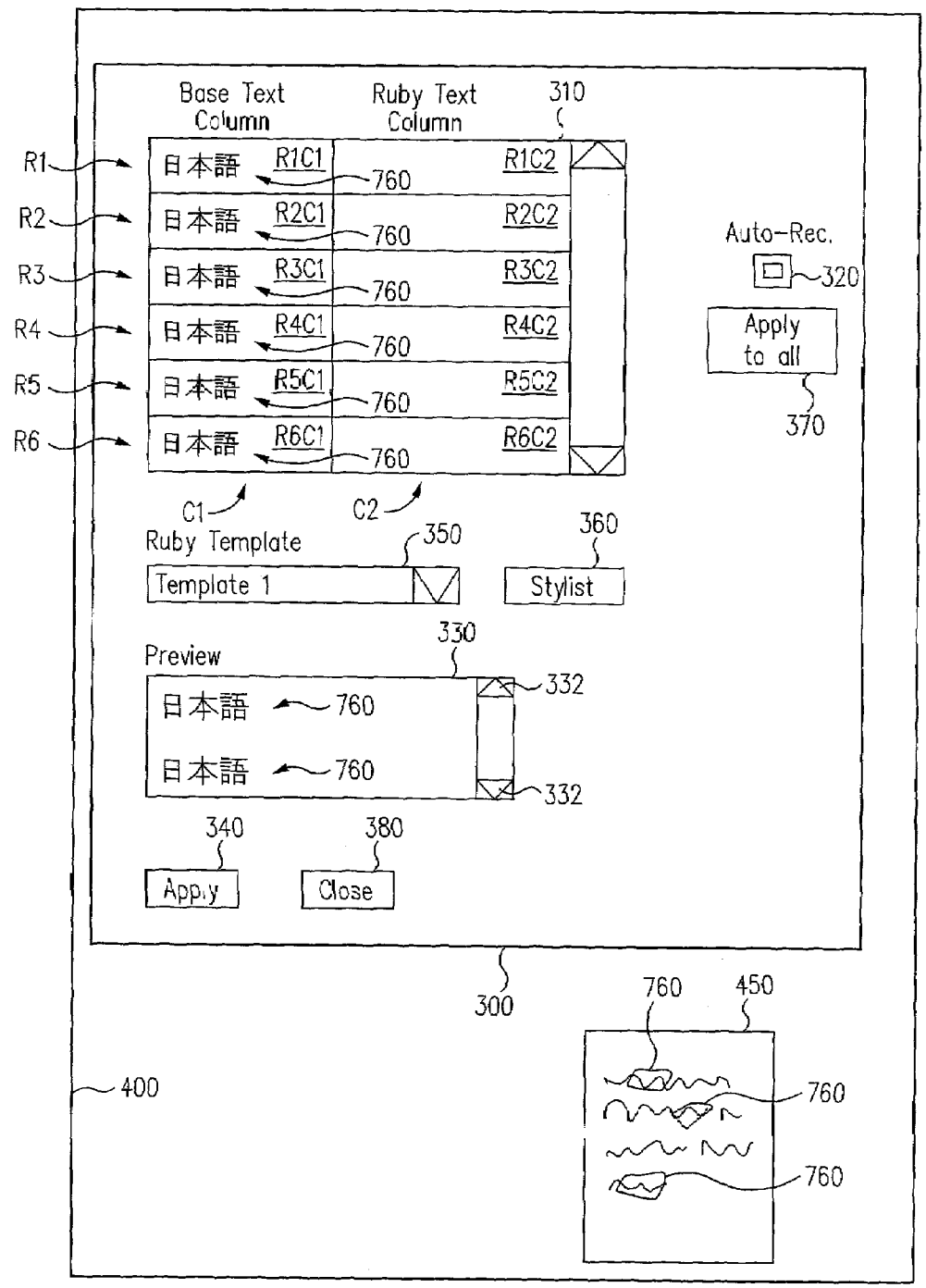
FIG. 7 illustrates the display including the ruby handling window of FIG. 5 according to an embodiment of the invention after a "search-for-all" has been performed.

The application of this feature in connection with the ruby handling functionality is illustrated now in connection with FIG. 7. In table 310 of ruby handling window 300, each row R1 to R6 contains the same base text 760, namely the term "nihongo". This is a result of searching for all occurrences of base text 760, i.e., the term "nihongo", in the working document in text document window 450.

A user enters corresponding ruby text into the first row R1 of ruby text column C2, i.e., into ruby text cell R1C2, of table 310. The user activates, e.g., pushes, apply to all button 370. Consequently the ruby text inserted into ruby text cell R1C2 is pasted into all other rows of ruby text column C2 adjacent base text 760, i.e., is pasted into all of the ruby text cells R1C2 to RnC2 of table 310. Thereby, a user easily generates a desired ruby text for each occurrence of a certain word or a certain text string in the working document in text document window 450.

Thus, for all occurrences of such a certain word or a certain text string, the ruby handling functionality is carried out all at the same time.

According to a particular embodiment, ruby text, which has been inserted or edited once for a certain base text, is applied to all other occurrences of this base text in the text document. This facilitates an easy ruby handling functionality for multiple occurrences of a certain base text for which the same ruby text should be generated.

Figure 8A:
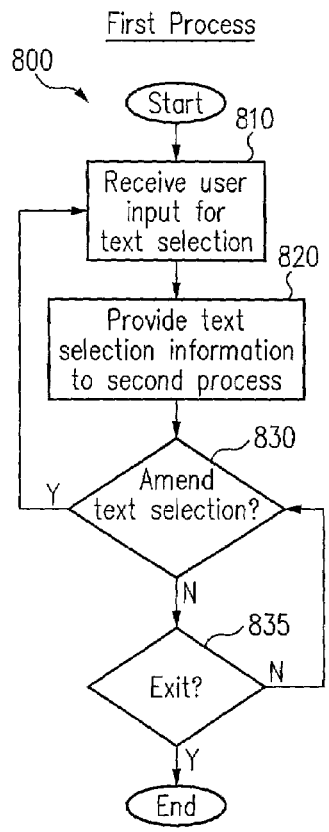
FIGS. 8A and 8B are flow charts illustrating a ruby handling functionality according to an embodiment of the invention.
Figure 8B:
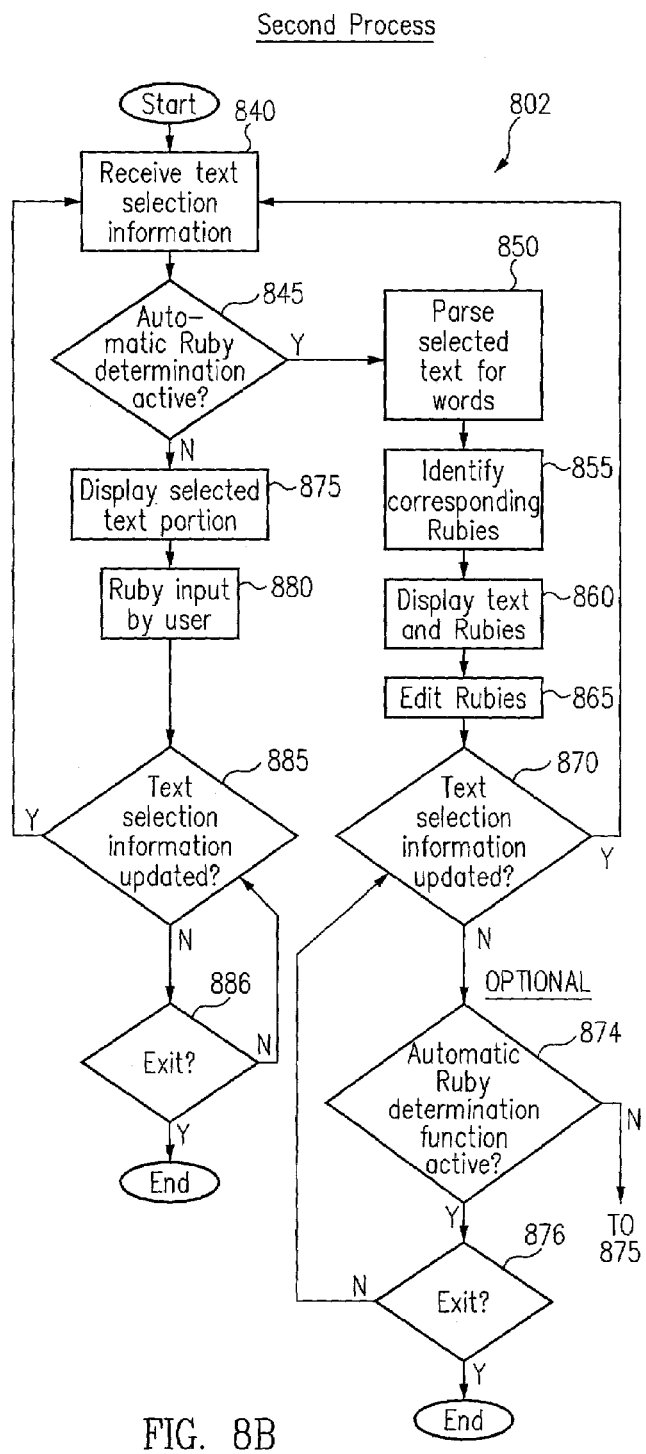

FIGS. 8A and 8B are flow charts 800 and 802, respectively, illustrating a ruby handling functionality according to an embodiment of the invention. Flowchart 800 of FIG. 8A illustrates a first process and flowchart 802 of FIG. 8B illustrates a second process. For example, the first and second processes correspond to first and second modules of an application program performing operations on a working document.

In a particular embodiment, the first process is a parent process (or a parent window) and the second process is a child process (or child window), which is called from the parent process. For example, the child process may be called from the parent process by pressing a certain key of the keyboard or by selecting a menu item from the task bar. For example, this menu item is labeled "ruby functionality".

In receive user input for text selection operation 810 of FIG. 8A, the first process receives a user input from a user. Thereby, the selected text, e.g., base text 560 of the working document in text document window 450 of FIG. 5, is selected. For example, this is done by using the mouse for marking some text portion in a well known manner.

In provide text selection information to second process operation 820 of FIG. 8A, information on the selected text is provided to the second process. This information is provided using any one of a number of techniques. For example, the selected text is copied directly into the second process. Alternatively, a pointer to a starting location of the selected text together with a length of the selected text is passed over from the first process to the second process. Another possibility is to deliver a stream from the first process to the second process, with an EOF marker indicating the end of the selected text.

Referring now to FIG. 8B, in a receive text selection information operation 840, the information on the selected text is received by the second process. In automatic ruby determination active operation 845, a determination is made as to whether the automatic ruby determination function is active. If the automatic ruby determination function is active, operations 850 to 865 are performed in a manner similar to that discussed above with regards to FIG. 3.

Briefly, in parse selected text for words operation 850, the selected text is parsed to detect individual words using any known parsing method for such individual words. In identify corresponding rubies operation 855, corresponding individual ruby text, if any, to the individual words are identified by looking in a database. If any individual ruby texts are identified, displayed text and rubies operation 860 displays the identified individual ruby texts together with the corresponding individual words of the base text, for example, as shown FIG. 3.

However, if in automatic ruby determination active operation 845, a determination is made that the automatic ruby determination function is inactive, display selected text portion operation 875 displays the selected text portion in the first row R1 of base text column C1, i.e., in base text cell R1C1, of table 310 as shown in FIG. 5.

Since no automatic ruby determination is carried out, no individual words are detected. Consequently, in display selected text portion 875, the whole selected text is displayed in a single row of table 310 and no ruby texts are displayed, as shown in FIG. 5. Table 310 is a mask for displaying the base text and the corresponding ruby text. Each row R1 to Rn of table 310 comprises two cells, the base text or left cell in base text column C1 for the base text and the ruby text or right cell in ruby text column C2 for the corresponding ruby text.

If a single base text has been selected and the corresponding selection information has been received by the second process in receive text selection information operation 840 and, if further a determination is made that the automatic ruby determination function is inactive in automatic ruby determination active operation 845, the whole selected base text is displayed in base text cell R1C1. Ruby text cell R1C2 is provided for allowing the user to input the ruby text corresponding to the selected base text displayed in base text cell R1C1.

In ruby input by user operation 880, a user inputs the ruby text corresponding to the selected base text into ruby text cell R1C2 of table 310.

If a user is not satisfied with the selected base text, then at any time, the user may amend the text selection in the first process. This is done because the first and second processes do not block each other, but rather, are running in parallel to each other. For example, by changing the focus window between windows 300 and 450 of FIG. 5, a user may switch focus between the first process (which may be a word processing operation) and the second process (which may be a ruby handling functionality).

In the first process, process flow continuously loops through amend text selection operation 830 and exit operation 835. A request by the user to amend the text section is detected in amend text selection operation 830 and process flow moves to receive user input for text selection operation 810. Alternatively, an action by the user to exit is detected in exit operation 835 and process flow exits. Although the first process is described above as continuously looping through amend text selection operation 830 and exit operation 835, in one embodiment, an event handler is used to avoid continuous looping as those of skill in the art will understand in light of this disclosure.

After having changed focus to the first process, a user may request to alter the text selection, e.g., by pressing the left mouse button and marking some text. This operation is detected in amend text selection operation 830. Thus, returning to receive user input for text selection operation 810, the corresponding text selection information is received and passed over to the second process in provide text selection information to second process operation 820.

In the second process, process flow loops through text selection information updated operations 870, 885 and exit operations 876, 886, respectively. Text selection information updated operation 885 or text selection information updated operation 870 of the second process detect whether the user has alter the selected text.

If alteration of the selected text is detected in text selection information updated operation 885 or text selection information updated operation 870, process flow moves to receive text selection information operation 840. This causes operations 840, 845, 875, 880 and 885 or operations 840, 845, 850, 855, 860, 865 and 870 to be repeated depending upon whether the automatic recognition function is inactive or active, respectively.

Alternatively, an action by the user to exit is detected in exit operations 876, 886 and process flow exits.

Although the second process is described above as continuously looping through text selection information updated operations 870, 885 and exit operations 876, 886, respectively, in one embodiment, an event handler(s) is used to avoid continuous looping as those of skill in the art will understand in light of this disclosure.

Consequently, a continuous updating of the text selection information is carried out, and an alteration of the base text selection is possible at any time (the ruby handling functionality can thus be said to be modeless). This provides a very flexible ruby handling functionality to the user.

According to a further embodiment in the case of the automatic ruby determination function being set active after operation 870 and before the second process ends, optionally, there may be carried out a further check whether the automatic ruby determination function is still active in an automatic ruby determination function active operation 874. If the automatic ruby determination function is no longer active, process flow moves directly to display selected text portion operation 875 and operations 875, 880, 885 proceed as described before. Since no automatic ruby determination function is being performed, the ruby text cells of ruby text column C2 of table 310 of FIG. 5 for example are cleared, sometimes called emptied. Furthermore, since no individual words are now detected, the whole selected base text is moved into base text cell R1C1 of table 310. If the automatic ruby determination function is still active, the second process continues to loop through operations 870, 874 and 876. Alternatively, an event handler is used.

Thus, in the case of the automatic ruby determination function being inactivated, the parsing of the base text and how the base text is displayed in table 310 only depends on the user selection of the base text and not on the results of the automatic ruby determination function as occurred in the example of FIG. 3.

Figure 9:
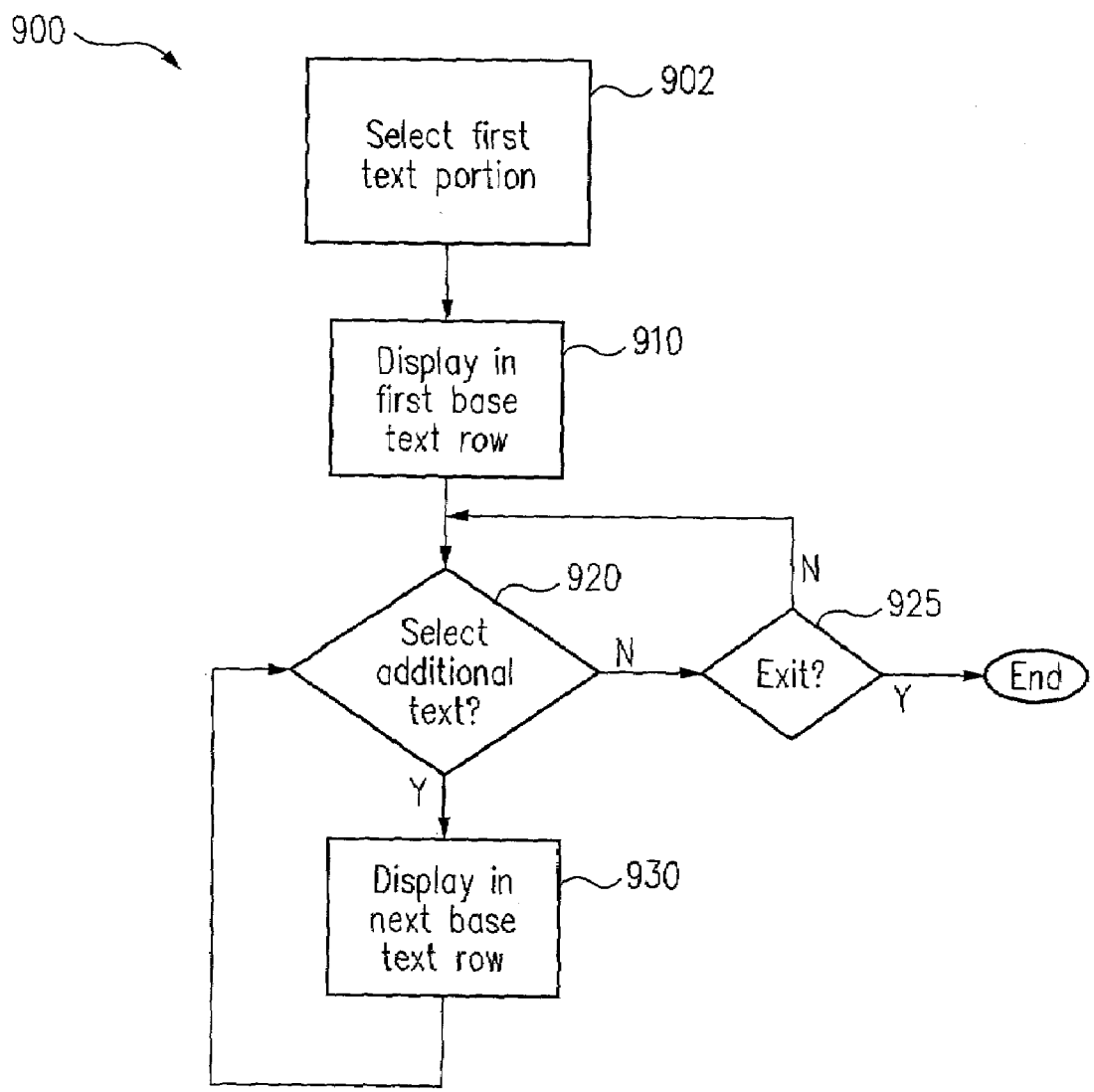
FIG. 9 is a flowchart illustrating a multi-selection process according to an embodiment of the invention.

FIG. 9 is a flowchart 900 illustrating a multi-selection process according to an embodiment of the invention. As has been explained before already, multiple text portions can be selected as base text. In select first text portion operation 902, a first base text is selected by the user. In display in first base text row operation 910, the selected first base text is displayed in the first row R1 of base text column C1, i.e., in base text cell R1C1, as illustrated in FIG. 6.

Process flow then continuously loops through select additional text operation 920 and exit operation 925. Selection of additional text by the user is detected in select additional text operation 920 and process flow moves to display in next base text row operation 930. Alternatively, an action by the user to exit is detected in exit operation 925 and process flow exits. For example, the user takes an action that indicates that no additional text is to be selected. Although the process is described above as continuously looping through select additional text operation 920 and exit operation 925, in one embodiment, an event handler is used to avoid continuous looping as those of skill in the art will understand in light of this disclosure.

If additional text selection is detected in select additional text operation 920, then the selected text is displayed in the next row of the base text column of the table in the ruby handling window in display in next base text row operation 930. The process returns to select additional text operation 920 due to the mode-less character of the ruby handling functionality.

As explained before, when text is selected, corresponding information is passed over from the first process to the second process of FIGS. 8A and 8B. If multiple text portions are selected, a corresponding plurality of informations is passed over, e.g., a plurality of pointers or the like.

In one embodiment, a ruby handling window is generated by the second process of FIG. 8B. The ruby handling window comprises a mask in which locations for display and editing are arranged in pairs, each pair comprising a first location for a base text, e.g., in base text column C1 of table 310 of FIG. 6, and a second location for corresponding ruby text (if any), e.g., in ruby text column C2 of table 310 of FIG. 6. If multiple base texts are passed over to the second process of FIG. 8B, they are displayed in correspondingly different first locations. If the mask takes the form of a table, as in FIGS. 3 to 7, each individual selected base text is displayed in a different row of base text column C1.

Figure 10:
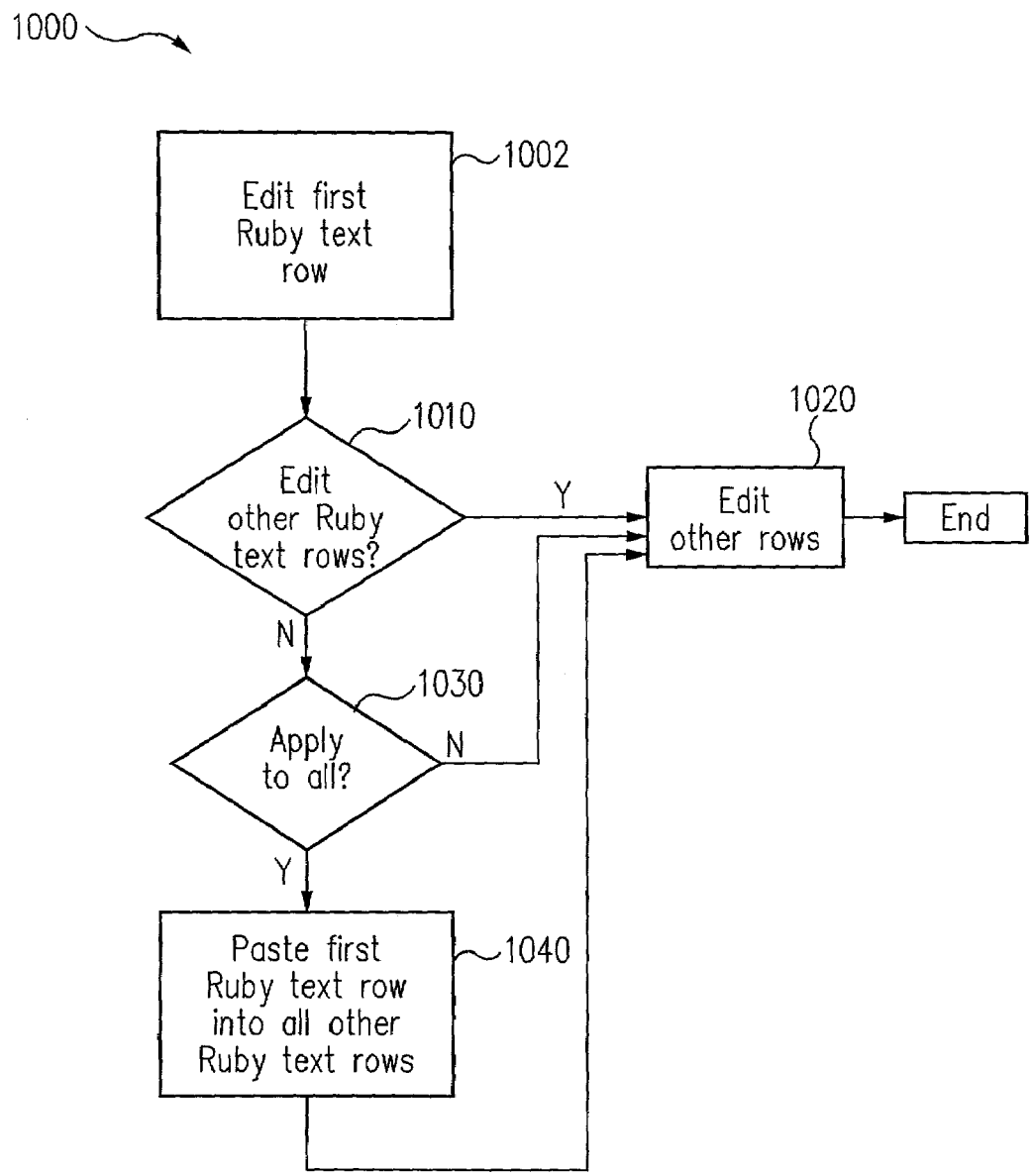
FIG. 10 is a flowchart illustrating a search for all process according to an embodiment of the invention.

FIG. 10 is a flowchart 1000 illustrating a "search for all" process according to an embodiment of the invention. Ruby text in the first row and second ruby text column of the table in the ruby handling window is edited in an edit first ruby text row operation 1002. Edit other ruby text rows operation 1010 checks whether other ruby text cells are to be edited.

If other ruby text cells are to be edited, the process moves to edit other rows operation 1020. If no other ruby text cells are to be edited, then apply to all operation 1030 asks whether or not the first ruby text cell should be applied to all other ruby text cell. If yes, then in paste first ruby text row into all other ruby text rows operation 1040, the ruby text of the first ruby text cell is pasted into all other ruby text cells. Process flow then moves to edit other rows operation 1020, where ruby text cells can be further amended by the user. Thereby a certain ruby text is easily generated for multiple occurrences of a certain base text in a text document.

For ruby text generated as described before, a user may select a certain style or format according to the user's preferences. This will now be explained by referring again to FIG. 3. FIG. 3 shows pull-down ruby template menu 350 from which a user can select a certain template. The concept of templates is known from the comprehensive office application STAROFFICE, for example. It offers the user the possibility to define and select certain formats, which then are applied to a text. A template may, e.g., consist in the selection of a certain font, a certain font size, whether or not the style is bold-faced or not, courier or not, etc. Such templates may be generated using the stylist-option button 360 shown in FIG. 3. This option is known and will therefore not be explained in detail here.

According to a particular embodiment, there is provided a formatting option for formatting the ruby text according to formatting templates, which may be generated and selected by a user. This allows for a high flexibility of the style in which the display of the ruby text is carried out.

After the base text and the corresponding ruby text have been determined as described before (and accepted by the user, e.g. by pressing apply button 340), they may be displayed in the working document. The display of the ruby text can be carried out in a conventional manner and is therefore not described in detail here.

Figure 11:
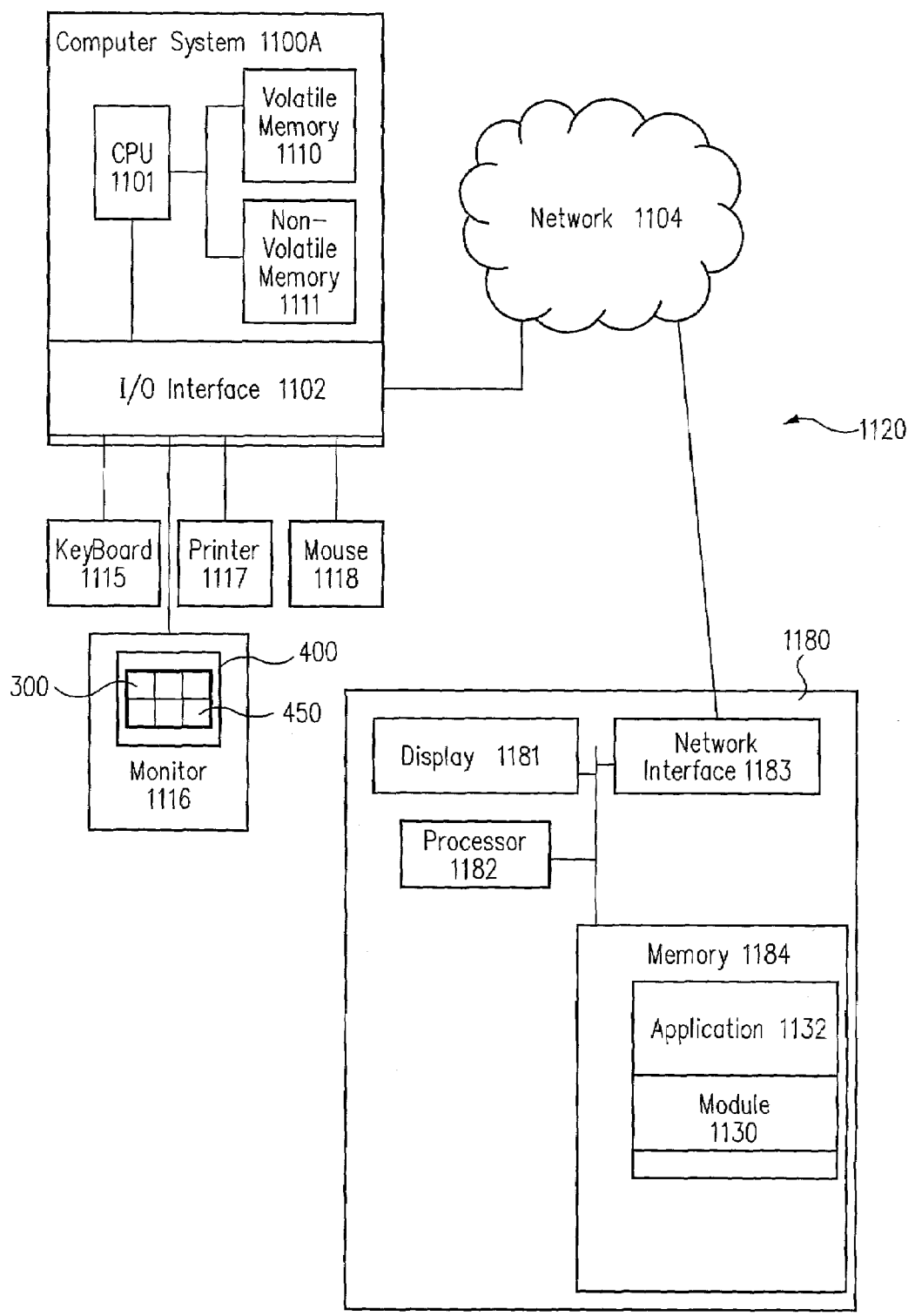
FIG. 11 is a diagram of a client-server system that includes a module for a ruby handling functionality according to an embodiment of the present invention.

According to one embodiment of the invention, as illustrated in FIG. 11, a module 1130 of an application 1132 executing on a server system 1180 of a client-server system 1120 performs a ruby handling functionality as described above. In FIG. 11, application 1132 and module 1130 are stored in a memory 1184 of server system 1180 and executed on server system 1180 that is coupled to client computer system 1100A by network 1104. The particular type of and configuration of client computer system 1100A is not essential to this embodiment of the invention. The client device should be able to display the information described herein, and to issue input commands, as described herein. Similarly, network 1104 can be any network or network system that is of interest to a user that couples client computer system 1100A to server system 1180.

Although module 1130 is illustrated as being a part of application 1132 in FIG. 11, this is illustrative only. Module 1130 should be capable of being called from application 1132. Moreover, those of skill in the art will understand that when it is said that a module or an operation takes some action, the action is the result of executing one or more instructions by a processor.

Figure 12:
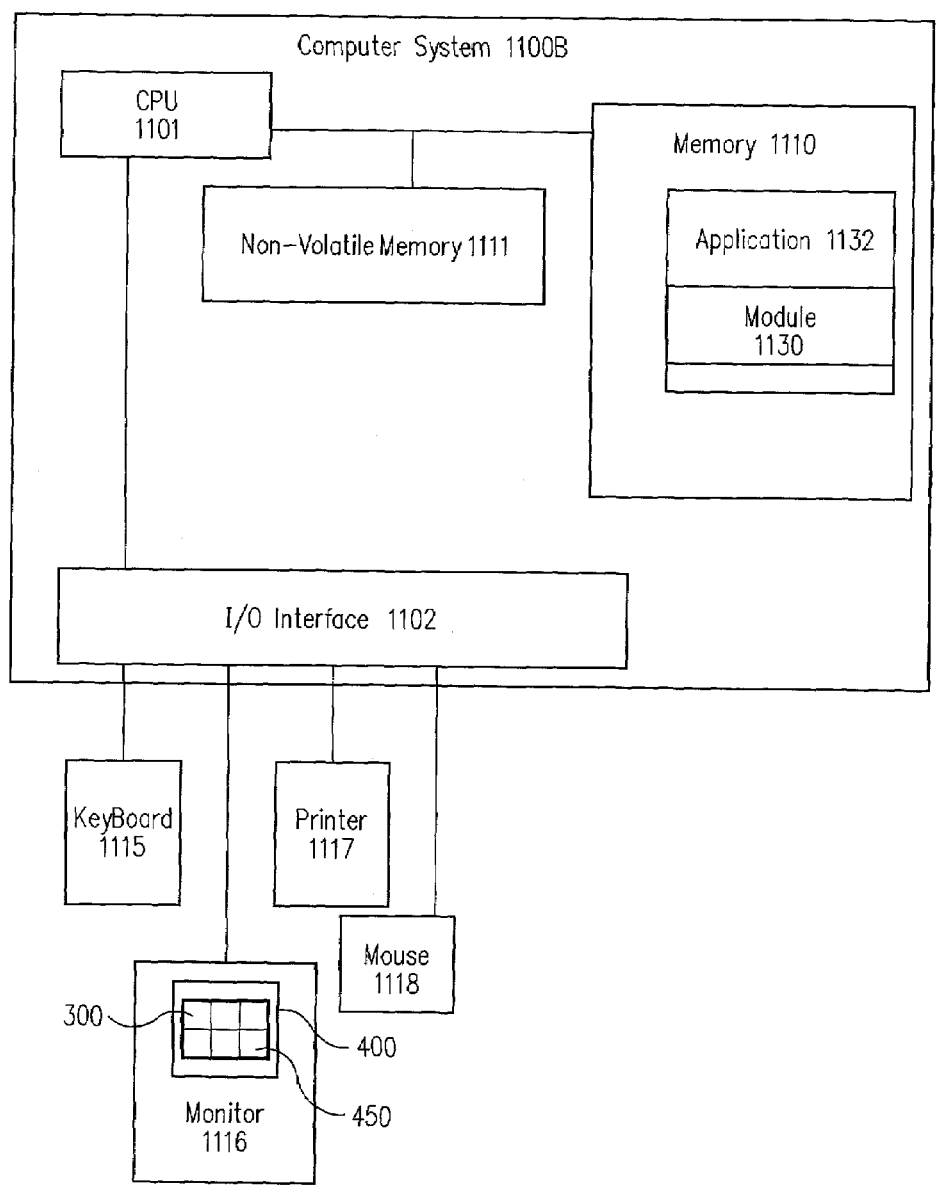
FIG. 12 is a diagram of a standalone system that includes a module for a ruby handling functionality according to an embodiment of the present invention.

FIG. 12 is an example of one embodiment of the invention implemented in a stand-alone computer system 1100B. The above comments with respect to FIG. 11 being illustrative only are directly applicable to FIG. 12 and are incorporated herein by reference. As is known to those of skill in the art, only module 1130 or a part of module 1130 may be contained in memory 1110 with the rest in memory 1111 at a given point in time.

Computer system 1100A and computer system 1100B may comprise a central processing unit 1101, an input output (I/O) unit 1102, a volatile memory 1110 and a non-volatile memory 1111. Systems 1110A and 1110B may further include standard input devices like a keyboard 1115, a mouse 1118, a printer 1117, a display device 1116, or a speech processing means (not illustrated). Display device 1116 is illustrated as having a display 400 having a ruby handling window 300 and a text document window 450 in accordance with this embodiment of the invention.

While embodiments of the invention have been described for a client-server configuration, and a stand-alone configuration, an embodiment of the invention may be carried out using any suitable hardware configuration involving a personal computer, a workstation, a portable device, or a network of computer devices. Herein, a computer program product comprises a medium configured to store or transport computer readable code for a ruby handling functionality in accordance with an embodiment of the invention. Some examples of computer program products are CD-ROM discs, ROM cards, floppy discs, magnetic tapes, computer hard drives, servers on a network and signals transmitted over a network representing computer readable program code.

As illustrated in FIGS. 11 and 12, this storage medium may belong to the computer system itself. However, the storage medium also may be removed from the computer system. For example, module 1130 may be stored in memory 1184 that is physically located in a location different from processor 1182. Processor 1182 should be coupled to the memory. This could be accomplished in a client-server system, or alternatively via a connection to another computer via modems and analog lines, or digital interfaces and a digital carrier line.

For example, memory 1184 could be in a World Wide Web portal, while display unit 1116 and processor 1101 are in personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 1100A, in one embodiment, can be a portable computer, a workstation, a two-way pager, a cellular telephone, a digital wireless telephone, a personal digital assistant, a server computer, an Internet appliance, or any other device that includes the components shown and that can execute the ruby handling functionality in accord with one embodiment of the invention as described herein. Similarly, in another embodiment, computer system 1100A can be comprised of multiple different computers, wireless devices, cellular telephones, digital telephones, two-way pagers, or personal digital assistants, server computers, or any desired combination of these devices that are interconnected to perform, the methods as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, the ruby handling functionality in accordance with one embodiment of invention can be implemented in a wide variety of computer system configurations. In addition, the ruby handling functionality could be stored as different modules in memories of different devices. For example, module 1130 could initially be stored in a server system 1180, and then as necessary, a portion of module 1130 could be transferred to a client device 1100A and executed on client device 1100A. Consequently, part of the ruby handling functionality would be executed on the server processor 1182, and another part would be executed on processor 1101 of client device 1100A. In view of this disclosure, those of skill in the art can implement various embodiments of the invention in a wide-variety of physical hardware configurations using an operating system and computer programming language of interest to the user.

In yet another embodiment, module 1130 is stored in memory 1184 of server system 1180. Stored module 1130 is transferred, over network 1104 to memory 1111 in system 1100A. In this embodiment, network interface 1183 and I/O interface 1102 would include analog modems, digital modems, or a network interface card. If modems are used, network 1104 includes a communications network, and module 1130 is downloaded via the communications network.

The ruby handling functionality in accordance with one embodiment of the invention may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, an embodiment of the invention also relates to a data carrier for storing a computer program for carrying out the inventive method. Another embodiment of the invention relates to a method for using a computer system for carrying out the presented inventive method. Yet another embodiment of the invention relates to a computer system with a storage medium on which a computer program for carrying out the presented inventive method is stored.

While the invention has been particularly shown with the reference to embodiments thereof, it will be understood by those skilled in the art that various other changes in the form and details may be made therein without departing from the spirit and scope of the invention. For example, the arrangement of a display of selected base text and corresponding ruby text not necessarily has to take place in the form of a table, any other arrangement can be chosen as well which allows the user to identify pairs of base text and corresponding ruby text, e.g. an arrangement in pairs of lines one after another.

What is claimed is:

1. A method comprising:
    selecting a first base text from a working document;
    determining whether an automatic ruby determination function is on or off, wherein upon a determination that said ruby determination function is off, said method comprising:
    displaying said first base text in a first base text cell in a first window, wherein said working document is in a second window;
    altering said first base text to a second base text comprising:
    changing focus to said second window; and
    selecting said second base text from said working document;
    displaying said second base text in said first base text cell; and
    entering a first ruby text into a first ruby text cell, and wherein upon a determination that said ruby determination function is on, said method comprising:
    detecting individual words in said first base text and identifying corresponding ruby text;
    parsing said first base text to detect said individual words;
    identifying said ruby text corresponding to said individual words; and
    displaying said ruby text together with said individual words.

2. The method of claim 1 further comprising editing said first ruby text.

3. The method of claim 1 further comprising adding said first ruby text to said working document.

4. The method of claim 3 further comprising displaying said first ruby text above said first base text in said working document.

5. The method of claim 1 wherein said first ruby text cell is in said first window.

6. The method of claim 5 further comprising changing focus between said first window and said second window.

7. The method of claim 1 wherein said second base text is a portion of said first base text.

8. The method of claim 1 wherein said working document comprises text.

9. The method of claim 8 wherein said working document is selected from the group consisting of a text document, a web site, and an image containing some text.

10. A method comprising:
selecting a first base text from a working document;
determining whether an automatic ruby determination function is on or off, wherein upon a determination that said ruby determination function is off, said method comprising:
displaying said first base text in a first base text cell in a first window, wherein said working document is in a second window;
selecting a second base text from said working document;
displaying said second base text in a second base text cell in said first window;
entering a first ruby text into a first ruby text cell; and
entering a second ruby text into a second ruby text cell, and wherein upon a determination that said ruby determination function is on, said method comprising:
detecting individual words in said first base text and identifying corresponding ruby text;
parsing said first base text to detect said individual words;
identifying said ruby text corresponding to said individual words; and
displaying said ruby text together with said individual words.

11. The method of claim 10 further comprising displaying said first base text, said second base text, said first ruby text, and said second ruby text in a preview window.

12. The method of claim 10 further comprising displaying said first ruby text above said first base text and said second ruby text above said second base text in said working document.

13. The method of claim 10 further comprising:
selecting a plurality of base texts from said working document comprising said selecting a first base text and said selecting a second base text;
displaying said plurality of base texts in a plurality of base text cells comprising said displaying said first base text and said displaying said second base text; and
entering a plurality of ruby texts in a plurality of ruby text cells comprising said entering a first ruby text and said entering a second ruby text.

14. A method comprising:
selecting a first base text from a working document;
determining whether an automatic ruby determination function is on or off, wherein upon a determination that said ruby determination function is off, said method comprising:
searching said working document for all occurrences of said first base text;
displaying said all occurrences of said first base text in base text cells in a first window, said working document being in a second window;
entering a ruby text into a first ruby text cell; and
pasting said ruby text into ruby text cells corresponding with said base text cells, said ruby text cells being in said first window, and wherein upon a determination that said ruby determination function is on, said method comprising:
detecting individual words in said first base text and identifying corresponding ruby text;
parsing said first base text to detect said individual words;
identifying said ruby text corresponding to said individual words; and
displaying said ruby text together with said individual words.

15. A computer system comprising a user interface, said user interface comprising:
a first window comprising base text cells and ruby text cells; and
an automatic recognition toggle for accepting user input to activate and deactivate an automatic recognition function which when active detects individual words in a first base text and identifies corresponding ruby text;
parses said first base text to detect said individual words;
identifies said ruby text corresponding to said individual words; and
displays said ruby text together with said individual words,
and when said automatic recognition function is inactive, said user interface accepting user input to:
display said first base text in a first base text cell in said first window, wherein a working document is in a second window;
altering said first base text to a second base text comprising:
changing focus to said second window; and
selecting said second base text from said working document;
displaying said second base text in said first base text cell; and
entering a first ruby text into a first ruby text cell.

16. The computer system of claim 15, wherein said user interface further comprising an apply to all button.

17. The computer system of claim 15 wherein said first window comprises a table comprising said base text cells and said ruby text cells.

18. A computer readable storage medium having stored thereon a module for a ruby handling functionality, wherein execution of said module generates a method comprising:
selecting a first base text from a working document;
determining whether an automatic ruby determination function is on or off, wherein upon a determination that said ruby determination function is off, said method comprising:
displaying said first base text in a first base text cell in a first window, wherein said working document is in a second window;
altering said first base text to a second base text comprising:
changing focus to said second window; and
selecting said second base text from said working document;
displaying said second base text in said first base text cell; and
entering a first ruby text into a first ruby text cell, and wherein upon a determination that said ruby determination function is on, said method comprising:
detecting individual words in said first base text and identifying corresponding ruby text;
parsing said first base text to detect said individual words;
identifying said ruby text corresponding to said individual words; and
displaying said ruby text together with said individual words.

19. The computer readable storage medium of claim 18 further comprising changing focus between said first window and said second window.

20. A computer system comprising:
a memory having stored therein a module for a ruby handling functionality; and a processor coupled to said memory, wherein execution of said module by said processor generates a method comprising:

selecting a first base text from a working document;

determining whether an automatic ruby determination function is on or off, wherein upon a determination that said ruby determination function is off, said method comprising:

displaying said first base text in a first base text cell in a first window, wherein said working document is in a second window;

altering said first base text to a second base text comprising:

changing focus to said second window; and selecting said second base text from said working document;

displaying said second base text in said first base text cell; and entering a first ruby text into a first ruby text cell, and wherein upon a determination that said ruby determination function is on, said method comprising:

detecting individual words in said first base text and identifying corresponding ruby text;

parsing said first base text to detect said individual words;

identifying said ruby text corresponding to said individual words; and displaying said ruby text together with said individual words.

21. The computer system of claim 20 further comprising changing focus between said first window and said second window.

22. A method comprising:

selecting a first base text from a working document;

determining whether an automatic ruby determination function is on or off, wherein upon a determination that said ruby determination function is off, said method comprising:

displaying said first base text in a first base text cell in a first window, wherein said working document is in a second window;

altering said first base text to a second base text comprising:

changing focus to said second window; and selecting said second base text from said working document;

displaying said second base text in said first base text cell; and entering a first ruby text into a first ruby text cell in said first window, and wherein upon a determination that said ruby determination function is on, said method comprising:

detecting individual words in said first base text and identifying corresponding ruby text;

parsing said first base text to detect said individual words;

identifying said ruby text corresponding to said individual words; and displaying said ruby text together with said individual words.

* * * * *